United States Patent
Yakhnenko et al.

(10) Patent No.: US 8,086,443 B2
(45) Date of Patent: Dec. 27, 2011

(54) SYSTEM AND METHOD FOR TEXT TAGGING AND SEGMENTATION USING A GENERATIVE/DISCRIMINATIVE HYBRID HIDDEN MARKOV MODEL

(75) Inventors: Oksana Yakhnenko, Ames, IA (US); Romer E. Rosales, Downingtown, PA (US); Radu Stefan Niculescu, Malvern, PA (US); Lucian Vlad Lita, San Jose, CA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 797 days.

(21) Appl. No.: 12/195,932

(22) Filed: Aug. 21, 2008

(65) Prior Publication Data

US 2009/0055183 A1   Feb. 26, 2009

Related U.S. Application Data

(60) Provisional application No. 60/957,729, filed on Aug. 24, 2007.

(51) Int. Cl.
*G06F 7/00* (2006.01)
*G06F 17/21* (2006.01)
*G10L 15/14* (2006.01)
*G10L 21/00* (2006.01)

(52) U.S. Cl. .......... 704/10; 707/609; 707/706; 707/723; 704/256.1; 704/270

(58) Field of Classification Search ...................... 704/10
See application file for complete search history.

(56) References Cited

OTHER PUBLICATIONS

Lawrence R. Rabiner, "A Tutorial on Hidden Markov Models and Selected Applications in Speech Recognition," pp. 257-286, Proceedings of the IEEE, vol. 77, No. 2, Feb. 1989.
Dong C. Liu, et al., "On the Limited Memory BFGS Method for Large Scale Optimization," pp. 1-26, Mathematical Programming, 45(3, (Ser. B)): 503-528, 1989.
Julia A. Lasserre, et al., "Principled Hybrids of Generative and Discriminative Models," pp. 87-94, in CVPR (1), 2006.

*Primary Examiner* — Justin Rider
(74) *Attorney, Agent, or Firm* — Joshua B. Ryan

(57) ABSTRACT

A method for sequence tagging medical patient records includes providing a labeled corpus of sentences taken from a set of medical records, initializing generative parameters $\theta$ and discriminative parameters $\tilde{\theta}$, providing a functional LL−C×Penalty, where LL is a log-likelihood function $$LL = \log p(\theta, \tilde{\theta}) + \prod_{l=1}^{M} \left[ \frac{\log p(X^l, Y^l | \tilde{\theta}) -}{\log p(X^l | \tilde{\theta})} \right] + \prod_{l=1}^{M} \log p(X^l | \theta),$$

$$\text{Penalty} = \sum_{y \in V_Y} (em_y^2 + tr_y^2 + e\tilde{m}_y^2 + t\tilde{r}_y^2),$$

where $em_y = 1 - \Sigma_{\forall x_i \in V_X} p(x_i|y)$, $e\tilde{m}_y = 1 - \Sigma_{\forall x_i \in V_X} \tilde{p}(x_i|y)$ are emission probability constraints, $tr_y = 1 - \Sigma_{\forall y_i \in V_Y} p(y_i|y)$, $t\tilde{r}_y = 1 - \Sigma_{\forall y_i \in V_Y} \tilde{p}(y_i|y)$ are transition probability constraints, and extracting gradients of LL−C×Penalty with respect to the transition and emission probabilities and solving $\theta_k^*, \tilde{\theta}_k^*$ that maximize LL−C×Penalty, initializing a new iteration with $\theta_k^*, \tilde{\theta}_k^*$ and incrementing C and repeating until solutions have converged, where parameters $\theta, \tilde{\theta}$ are the probabilities that a new sentence X' is labeled as Y'.

11 Claims, 3 Drawing Sheets

|  | CRF | Hybrid | HMM |
|---|---|---|---|
| baseNP | 78.7 | 81.5 | 74.87 |
| chunking | 70.8 | 76.0 | 72.76 |
| japaneseNE | 91.8 | 91.6 | 91.47 |
| segmentation | 75.8 | 72.8 | 70.8 |
| average | 79.3 | 80.5 | 77.5 |

SYSTEM AND METHOD FOR TEXT TAGGING AND SEGMENTATION USING A GENERATIVE/DISCRIMINATIVE HYBRID HIDDEN MARKOV MODEL

CROSS REFERENCE TO RELATED UNITED STATES APPLICATIONS

This application claims priority from "Hybrid Hidden Markov Models", U.S. Provisional Application No. 60/957,729 of Yakhnenko, et al., filed Aug. 24, 2007, the contents of which are herein incorporated by reference in their entireties.

TECHNICAL FIELD

This disclosure is directed to sequence tagging in medical patient records mining.

DISCUSSION OF THE RELATED ART

Tagging and segmentation are tasks that have many applications not only in natural language processing, but also in computational biology, spoken language recognition and other fields. The goal is to assign a label to each entity in a text passage or sequence in general. Several non-limiting examples of this task include part-of-speech tagging, shallow parsing and named entity recognition. For example, in part-of-speech tagging the goal is to predict which words are nouns, verbs, adjectives, etc in a sentence; in shallow parsing the goal is to predict noun phrases, verb phrases, as well as adjectives and adverbs in a sentence; in named-entity recognition the goal is to locate and classify specific entities in the text such as persons, organizations, locations, and other entities of interest.

A Hidden Markov Model (HMM) can provide a natural way of modeling sequences and their tags, and has been widely used in various applications that require text segmentation and tagging. It models the words in the text as observations, and the tags as hidden states. The model parameters are probabilities for transition between the states, and probabilities for emission of an observation given the state. When the data is fully observable and the sequence tags are known at training, these parameters can be quickly estimated using empirical counts. Once the model for the task is trained, the new text can be classified and the output sequence can be computed efficiently using Viterbi decoding. Hidden Markov Model also allows for the use of unlabeled data.

On the other hand, since it is desired to build a model with high classification accuracy, the use Conditional Random Fields (CRF) can provide a discriminative counterpart of Hidden Markov Models. Conditional Random Fields assume a similar structure as Hidden Markov Models (dependencies between neighboring states and between states and observation) however it is an undirected model. The parameters maximize the probability of the correct output given the input sequence. While a CRF can have higher classification accuracy than an BMM, it usually cannot incorporate unlabeled data in training.

There has been much research concerning the tradeoffs between generative and discriminative models. It has been shown that generative models in general perform better than their discriminative counterparts when less training data is available; however they have lower classification accuracy as the training set size increases. Discriminative models also tend to over-fit on the training data which can result in a poor generalization ability on unseen test data. Hybrid models attempt to combine the strength of generative and discriminative models for classification in a single model. One would expect a hybrid model to have a higher accuracy regarding the size of the training data, as well as to provide regularization so that the model does not over-fit on the training data.

While there has been much research in the analysis of generative/discriminative models, there has been little application of the hybrid models, especially in the natural language processing tasks and in tasks which require prediction of the structured outputs, such as tagging. After the trade-offs between generative/discriminative models became better understood, there has been a surge of work on generative/discriminative hybrid models which considered a linear combination of the classifiers.

A Hidden Markov Model was originally applied to an image classification task to predict a label for an image, where a Naive Bayes type model was assumed. Recently, a Markov Random Field model was used in a similar framework for simple classification task.

These models only consider a single label classification. There have been some attempts to incorporate unlabeled data into the training procedure in CRF. For example, one study incorporated unlabeled data into training of the CRF by using the product of the conditional likelihood $p(y|x)$ and the likelihood of the observations $p(x)$ as the objective function for training of the model.

SUMMARY OF THE INVENTION

Exemplary embodiments of the invention as described herein generally include methods and systems for a hybrid generative/discriminative Hidden Markov Model for text tagging and segmentation. A method according to an embodiment of the invention assumes one model with two types of parameters which model generative and discriminative properties of the model, and a prior which trades off between the parameters. This model generalizes properties of a generative model (such as a Hidden Markov Model) and a discriminative model (such as a Conditional Random Field or a maximum entropy Markov model). It has been shown that while generative models generally have poorer performance than their discriminative counterparts, generative models perform better when the data is limited, which is often the case in the natural language processing problems, where the data is very sparse. A hybrid model according to an embodiment of the invention can incorporate unlabeled data, abundant in the natural language processing tasks, unlike discriminative models which need to have the label information.

A model according to an embodiment of the invention has been applied to several small-scale tasks, such as prediction of noun-phrases and Chinese character segmentation, as well as large tasks, such as shallow parsing and named entity recognition. Results are compared with a (purely generative) Hidden Markov Model, and a (purely discriminative) Conditional Random Field, and are more accurate than Hidden Markov Model and as accurate as or better than the Conditional Random Field.

According to an aspect of the invention, there is provided a method for sequence tagging medical patient records, the method including providing a labeled corpus $D=\{X^l, Y^l\}_{l=1}^{M}$ of M sentences taken from a set of medical records, where $X=x_1 \ldots x_n$ is a sentence, $x_j$ is a word at position j from a finite vocabulary $V_X$, each word $x_j$ having a label $y_j$ from a finite vocabulary $V_Y$, and Y is a collection of labels for the sentence X, where the labels are sequence tags for sentence X, initializing generative parameters $\theta$ and discriminative parameters $\tilde{\theta}$, where $\theta=\{p(x_i|y_j), p(y_i|y_j), \forall y_i, y_j \in V_Y, \forall x_i \in V_X\}$ are generative parameters and $\tilde{\theta}=\{\tilde{p}(x_i|y_j), \tilde{p}(y_i|y_j), \forall y_i, y_j \in V_Y,$ ∀$x_i ∈ V_X$} are discriminative parameters, and $p(x_i|y_j)$, $\tilde{p}(x_i|y_j)$ are emission probabilities and $p(y_i|y_j)$, $\tilde{p}(y_i|y_j)$ are transition probabilities, and finding parameters $\theta, \tilde{\theta}$ that maximize a functional LL−C×Penalty, where LL is a log-likelihood function $$LL = \log p(\theta, \tilde{\theta}) + \prod_{l=1}^{M} \begin{bmatrix} \log p(X^l, Y^l | \tilde{\theta}) - \\ \log p(X^l | \tilde{\theta}) \end{bmatrix} + \prod_{l=1}^{M} \log p(X^l | \theta),$$

where $$p(\theta, \tilde{\theta}) \propto p(\theta) p(\tilde{\theta}) \frac{1}{\sigma} \exp\left(-\frac{\|\theta - \tilde{\theta}\|^2}{2\sigma^2}\right)$$

is a prior where $\sigma$ is a tradeoff parameter that balances contributions of the generative parameters and discriminative parameters, $$p(X^l, Y^l | \tilde{\theta}) = \prod_{t=1}^{n} p(x_t^l | y_t^l, \tilde{\theta}) p(y_t^l | y_{t-1}^l, \tilde{\theta}), \text{ and}$$

$$p(X_L | \tilde{\theta}), p(X^l | \theta)$$

are calculated as $$p(X | \theta) = \sum_y \alpha_t(y | \theta) \beta_t(y | \theta),$$

where $$\alpha_t(y_t) = p(x_1, \ldots, x_t, y_t) = p(x_t | y_t) \sum_y p(y_t | y) \alpha_{t-1}(y),$$

with $\alpha_0 = 1$, and $$\beta_t(y_t) = p(x_{t+1}, \ldots, x_n | y_t) = \sum_y \beta_{t+1}(y) p(x_{t+1} | y) p(y | y_t)$$

with $\beta_t = 1$, Penalty is a penalty function defined as $$\sum_{y \in V_Y} (em_y^2 + tr_y^2 + e\tilde{m}_y^2 + t\tilde{r}_y^2),$$

where $em_y = 1 - \Sigma_{\forall x_i \in V_X} p(x_i|y)$, $e\tilde{m}_y = 1 - \Sigma_{\forall x_i \in V_X} \tilde{p}(x_i|y)$ are emission probability constraints for state y and $tr_y = 1 - \Sigma_{\forall y_i \in V_Y} p(y_i|y)$, $t\tilde{r}_y = 1 - \Sigma_{\forall y_i \in V_Y} \tilde{p}(y_i|y)$ are transition probability constraints for state, and C is a constant, where parameters $\theta, \tilde{\theta}$ are the probabilities that a new sentence X' is labeled as Y'.

According to a further aspect of the invention, initializing parameters $\theta$ and $\tilde{\theta}$ comprises finding $\theta, \tilde{\theta}$ that maximize $\Pi_{l=1}^M p(X^l, Y^l | \theta)$, $\Pi_{l=1}^M p(X^l, Y^l | \tilde{\theta})$.

According to a further aspect of the invention, maximizing LL−C×Penalty comprises fixing C, extracting gradients of LL−C×Penalty with respect to the transition and emission probabilities, solving for $\theta_k^*, \tilde{\theta}_k^*$, initializing a new iteration with $\theta_k^*, \tilde{\theta}_k^*$ and incrementing C, and repeating the steps of extracting gradients and initializing a new iteration until solutions $\theta_k^*, \tilde{\theta}_k^*$ have converged, or until a maximum number of iterations have been executed.

According to a further aspect of the invention, the sequence tagging comprises one of part-of-speech tagging, shallow parsing, and named entity recognition.

According to a further aspect of the invention, the method includes maximizing only the conditional likelihoods $p(X^l | \tilde{\theta})$, $p(X^l | \theta)$ of functional LL−C×Penalty for a predetermined number of iterations, prior to maximizing LL−C×Penalty.

According to another aspect of the invention, there is provided a method for sequence tagging medical patient records, the method including providing a labeled corpus $D = \{X^l, Y^l\}_{l=1}^M$ of M sentences taken from a set of medical records, where $X = x_i \ldots x_n$ is a sentence, $x_j$ is a word at position j from a finite vocabulary $V_X$, each word $x_j$ having a label $y_j$ from a finite vocabulary $V_Y$, and Y is a collection of labels for the sentence X, where the labels are sequence tags for sentence X, initializing generative parameters $\theta$ and discriminative parameters $\tilde{\theta}$, where $\theta = \{p(x_i|y_j), p(y_i|y_j), \forall y_i, y_j \in V_Y, \forall x_i \in V_X\}$ are generative parameters and $\tilde{\theta} = \{\tilde{p}(x_i|y_j), \tilde{p}(y_i|y_j), \forall y_i, y_j \in V_Y, \forall x_i \in V_X\}$ are discriminative parameters, and $p(x_i|y_j)$, $\tilde{p}(x_i|y_j)$ are emission probabilities and $p(y_i|y_j)$, $\tilde{p}(y_i|y_j)$ are transition probabilities, providing a functional LL−C×Penalty, where LL is a log-likelihood function $$LL = \log p(\theta, \tilde{\theta}) + \prod_{l=1}^{M} \begin{bmatrix} \log p(X^l, Y^l | \tilde{\theta}) - \\ \log p(X^l | \tilde{\theta}) \end{bmatrix} + \prod_{l=1}^{M} \log p(X^l | \theta),$$

$$\text{Penalty} = \sum_{y \in V_Y} (em_y^2 + tr_y^2 + e\tilde{m}_y^2 + t\tilde{r}_y^2),$$

where $em_y = 1 - \Sigma_{\forall x_i \in V_X} p(x_i|y)$, $e\tilde{m}_y = 1 - \Sigma_{\forall x_i \in V_X} \tilde{p}(x_i|y)$ are emission probability constraints for state y, $tr_y = 1 - \Sigma_{\forall y_i \in V_Y} p(y_i|y)$, $t\tilde{r}_y = 1 - \Sigma_{\forall y_i \in V_Y} \tilde{p}(y_i|y)$ are transition probability constraints for state y, and C is a constant, and extracting gradients of LL−C×Penalty with respect to the transition and emission probabilities and solving $\theta_k^*, \tilde{\theta}_k^*$ that maximize LL−C×Penalty, where parameters $\theta, \tilde{\theta}$ are the probabilities that a new sentence X' is labeled as Y'.

According to a further aspect of the invention, the method includes initializing a new iteration with $\theta_k^*, \tilde{\theta}_k^*$ and incrementing C; and repeating the steps of extracting gradients and initializing a new iteration until solutions $\theta_k^*, \tilde{\theta}_k^*$ have converged, or until a maximum number of iterations have been executed.

According to a further aspect of the invention, $$p(\theta, \tilde{\theta}) \propto p(\theta) p(\tilde{\theta}) \frac{1}{\sigma} \exp\left(-\frac{\|\theta - \tilde{\theta}\|^2}{2\sigma^2}\right)$$

is a prior where $\sigma$ is a tradeoff parameter that balances contributions of the generative parameters and discriminative parameters.

According to a further aspect of the invention, $$p(X^l, Y^l \mid \theta) = \prod_{t=1}^{n} p(x_t^l \mid y_t^l, \theta) p(y_t^l \mid y_{t-1}^l, \theta).$$

According to a further aspect of the invention, $p(X_L \mid \tilde{\theta})$, $p(X^l \mid \theta)$ are calculated as $$p(X \mid \theta) = \sum_y \alpha_t(y \mid \theta) \beta_t(y \mid \theta),$$

where $$\alpha_t(y_t) = p(x_1, \ldots, x_t, y_t) = p(x_t \mid y_t) \sum_y p(y_t \mid y) \alpha_{t-1}(y),$$

with $\alpha_0 = 1$, and $$\beta_t(y_t) = p(x_{t+1}, \ldots, x_n \mid y_t) = \sum_y \beta_{t+1}(y) p(x_{t+1} \mid y) p(y \mid y_t)$$

with $\beta_T = 1$.

According to another aspect of the invention there is provided a program storage device readable by a computer, tangibly embodying a program of instructions executable by the computer to perform the method steps for sequence tagging medical patient records.

DETAILED DESCRIPTION OF EXEMPLARY EMBODIMENTS

Figures 1, 2:
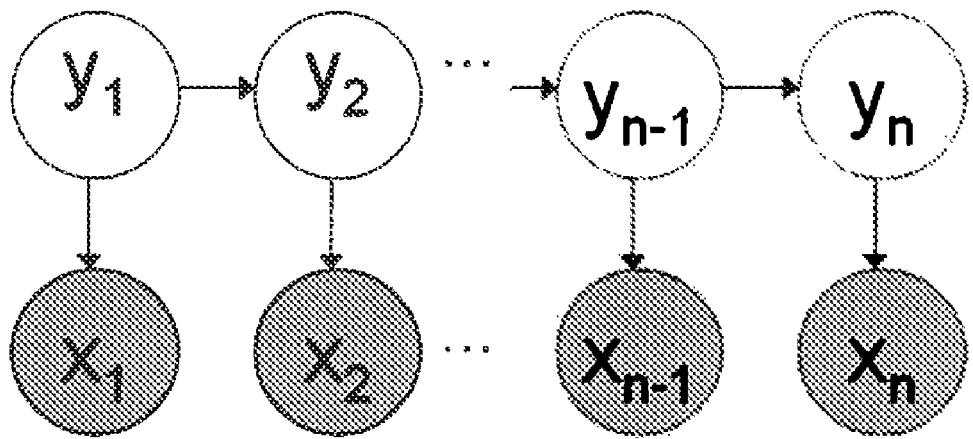
FIG. 1 illustrates a first-order hidden Markov model, according to an embodiment of the invention.
FIG. 2 is a table of results comparing performance accuracies (in %) of CRF, HMM, and a hybrid model according to an embodiment of the invention for $\alpha=0.5$ for small datasets, according to an embodiment of the invention.

Exemplary embodiments of the invention as described herein generally include systems and methods for sequence tagging using a hybrid hidden Markov model. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

Notation

Let D be a labeled corpus of M sentences. Let $X^l$ be $l^{th}$ sentence of length $T^l = \text{length}(X^l)$ where each word comes from a finite vocabulary $V_X$. Sometimes the superscript l may be dropped to refer to an arbitrary sequence from D. Let $x_j$ be a word at position j of a sentence X. Let X be a set of all possible sentences. Each word $x_j$ has a label $y_j$ from a finite vocabulary $V_Y$, and the collection of these labels compose label Y for the sentence X, and so D is a collection of sentence/label pairs: $D=\{X^l, Y^l\}_{l=1}^M$. Y is used to denote a set of all possible output sequences (labels). Given a new instance $X_{new}$ the goal is to assign a label $Y_{new}$, that is, to assign a label to each of the elements in $X_{new}$.

Generative Models and the Hidden Markov Model

A Hidden Markov Model is a generative model frequently used for structured prediction problems. HMM assumes that each state generates an observation (emission) as well as a next state (transition), and there is a probability associated for all possible emissions and transitions. FIG. 1 illustrates a first-order HMM, with states $y_1, y_2, y_{n-1}$, and $y_n$, and observations $x_1, x_2, x_{n-1}$ and $x_n$. HMM models the joint probability of $p(X, Y)$ as the product of the transition and emission probabilities. Fixing $y_0$ to a 'dummy' node, the probability becomes:

$$p(x_1, \ldots, x_n, y_1, \ldots, y_n) = \prod_{t=1}^{n} p(x_t \mid y_t) p(y_t \mid y_{t-1}). \quad (1)$$

Let $\theta = \{p(x_i \mid y_j), p(y_i \mid y_j), \forall y_i, y_j \in V_Y, \forall x_i \in V_X\}$ be vector of the model parameters. For an HMM, the parameters $p(x_i \mid y_j)$ are the emission and $P(y_i \mid y_j)$ are the transition probabilities. The training of the model results in estimating the transition and emission probabilities from a labeled corpus D. Generative training finds the parameters maximize the joint likelihood of the data:

$$\theta^* = \arg\max_\theta p(D \mid \theta) = \arg\max_\theta \Pi_{l=1}^M p(X^l, Y^l \mid \theta).$$

If all states are assumed to be fully observable, in particular the labels Y, then the learning of the parameters (emission and transition probabilities) is easy, and is given by relative frequency estimates. If some states are partially observable or unknown, then the parameters are learned to maximize the probability of observations $p(X \mid \theta) = \Sigma_{Y' \in Y} p(X, Y' \mid \theta)$. Alternatively, the parameters can be fitted using an expectation maximization procedure. The task of computing the probability by marginalizing out the states in a naive fashion is intractable, as it is exponential in the number of labels, however, it can be done efficiently using a forward-backward procedure. This procedure is briefly reviewed here, as it is used with a training algorithm for a hybrid model according to an embodiment of the invention. Using $\alpha_t$ to denote forward probability and $\beta_t$ to denote backward probability, one has $$\alpha_t(y_t) = p(x_1, \ldots, x_t, y_t) = p(x_t \mid y_t) \sum_y p(y_t \mid y) \alpha_{t-1}(y)$$

where $\alpha_0 = 1$, and $$\beta_t(y_t) = p(x_{t+1}, \ldots, x_n \mid y_t) = \sum_y \beta_{t+1}(y) p(x_{t+1} \mid y) p(y \mid y_t)$$

where $\beta_T = 1$.

Then the probability of sentence $X=x_1 \ldots x_T$ can be computed efficiently using $$p(X) = \sum_{Y' \in Y} p(X|Y') = \sum_y \alpha_T(y)\beta_T(y) \quad (2)$$

Discriminative Models and Conditional Random Fields

When maximum classification accuracy is desired, the classification task can be solved directly. In the context of the probabilistic models, this reduces to maximizing the conditional likelihood of the data instead of the joint likelihood so that the optimal parameters of the model are $\theta^* = \arg\max_\theta p(Y|X,\theta)$. The sentence is represented in terms of emission and transition features, and each feature is assigned a weight. Unlike the HMM, these weights do not have to be probabilities. For example, consider the probability $$p(Y|X) = \frac{1}{Z}\exp(\phi(X,Y)w),$$

where $Z = \sum_{Y' \in Y}\exp(\phi(X,Y')w)$. If one imposes probability constraints on the exponentiated weights $\exp(w)$ (the exponentiated emission weights and transition weights have to sum to 1 to maintain a valid probability distribution on the parameters), then the Hidden Markov Model, which maximizes class-conditional likelihood, is recovered.

There are trade-offs associated with both training regimens, and while "discriminatively trained" models need more data, these models also result in a more accurate classifier. Therefore there has been a growing interest in hybrid models, mixtures of generatively/discriminatively trained probabilistic models.

Generative/Discriminative Hybrid Hidden Markov Models

According to an embodiment of the invention, a hybrid Hidden Markov Model for principled generative/discriminative models formulated as an optimization task can predict structured output which is more general than generative HMM and a maximum entropy Markov model, and empirically has a better performance accuracy than generative HMM and in most cases outperforms the CRF.

Framework for Principled Generative/Discriminative Hybrid Models

According to an embodiment of the invention, to combine the strengths of generative and discriminative training, one can trade-off between the parameters of joint likelihood and conditional likelihood objectives. Given a probabilistic model parameterized by $\theta$, one can assume that in addition to generative parameters $\theta$, there are discriminative parameters $\tilde{\theta}$. Using these parameters the joint likelihood takes the form:

$$p(X,Y,\theta,\tilde{\theta}) = p(\theta,\tilde{\theta})p(Y|X,\tilde{\theta})p(X|\theta), \quad (3)$$

where $$p(Y|X,\tilde{\theta}) = \frac{p(X,Y|\tilde{\theta})}{\sum_{Y' \in Y} p(X,Y'|\tilde{\theta})}, \quad (4)$$

the probability $p(X,Y|\tilde{\theta})$ is modeled using discriminative parameters, and the probability of an instance $p(X|\theta) = \sum_{Y'} p(X,Y'|\theta)$ is modeled with generative parameters and is computed by marginalizing over all possible label sequences. The functional form of the joint probability is the same given generative and discriminative parameters.

The prior $p(\theta,\theta')$ makes the generative and discriminative parameters codependent, and controls the tradeoff between the strength of influence of generative and discriminative parameters. According to an embodiment of the invention, the prior is of the form $$p(\theta,\tilde{\theta}) \propto p(\theta)p(\tilde{\theta})\frac{1}{\sigma}\exp\left(-\frac{\|\theta - \tilde{\theta}\|^2}{2\sigma^2}\right).$$

Here, $\sigma \in (0,\infty)$ controls the strength of the trade-off between the parameters. If $\sigma \to 0$, then the generative and discriminative parameters are equal, resulting in the initial generative model. If or $\sigma \to \infty$ then the parameters become independent and a recover the purely discriminative model. Since it is easier to work in $(0, 1)$ space instead of $(0, \infty)$ space, according to an embodiment of the invention, the trade-off parameter are mapped to $(0, 1)$ space by setting $$\sigma = \left(\frac{\alpha}{1-\alpha}\right)^2$$

and so $\alpha \to 0$ results in the generative model, and $\alpha \to 1$ results in the discriminative model.

Hybrid HMM

According to an embodiment of the invention, this objective is reformulated for the hybrid Hidden Markov Model and maximized.

Considering that the data are independently identically distributed, the log-likelihood of the corpus is:

$$\log p(D) = \sum_{l=1}^{M} \log p(X^l, Y^l).$$

A Hidden Markov Model according to an embodiment of the invention is parameterized with transition and emission probabilities, and it is desired to estimate generative parameters $$\theta = \{p(x_i|y_j), p(y_i|y_j), \forall y_i, y_j \in V_Y, \forall x_i \in V_X\},$$

and discriminative parameters $$\tilde{\theta} = \{\tilde{p}(x_i|y_j), \tilde{p}(y_i|y_j), \forall y_i, y_j \in V_Y, \forall x_i \in V_X\},$$

that maximize the log-likelihood over the training dataset:

$$\max_{\theta,\tilde{\theta}} LL = \log p(\theta,\tilde{\theta}) + \sum_{l=1}^{M}\left[\log p(X^l, Y^l|\tilde{\theta}) - \log p(X_L|\tilde{\theta})\right] + \prod_{l=1}^{M} \log p(X^l|\theta), \quad (5)$$

where $$p(Y^l|X^l,\tilde{\theta}) = p(X^l,Y^l|\tilde{\theta})/p(X^l|\tilde{\theta}),$$

and the probabilities $p(X^l,Y^l|\tilde{\theta})$ and $p(X^l|\tilde{\theta})$ are computed as in EQS. (1) and (2), respectively.

Since the parameters are the entries in probability tables, it is necessary that the solutions to the optimization are non-deficient probability parameters, and thus the emission and transition probabilities should sum to 1 for each state:

$$\sum_{x_i \in V_X} p(x_i|y_j) = 1, \forall y_j \in V_Y,$$

and $$\Sigma_{y_i \in V_Y} p(y_i|y_j) = 1, \forall y_j \in V_Y.$$

Similar emission and transition probability constraints need to hold for discriminative parameters θ.

In principle, any probabilistic model can be put in this context. Markov Random Fields (MRF) have unconstrained parameters, the probability is computed via global normalization, and in spirit are closer to the Conditional Random Fields. One can derive a similar objective for their hybrid counterpart. Unfortunately, the optimization in this case is intractable. In order to compute p(X) for the CRF/MRF hybrid, while it is possible to compute the normalization term for the CRF ($Z_Y = \Sigma_Y \exp(w\phi(X,Y))$), needed to compute p(Y|X), it would also be necessary to compute the normalization term $Z_{XY} = \Sigma_{X,Y} \exp(w\phi(X,Y))$ needed to compute p(X), which requires summation over all possible labels and sentences. While this cannot be done explicitly, this summation could be approximated, using, for example, Gibbs sampling or a Markov chain Monte Carlo simulation. However, this approximation can still be slow. According to an embodiment of the invention, the Hidden Markov Model is used as a generative model, and a probability constrained conditional Markov model is used as a discriminative model.

Optimization

To optimize the log-likelihood function and satisfy the constraints, a Quadratic Penalty method is used. Quadratic Penalty transforms a constraint task into an equivalent unconstrained task by penalizing the objective function when the constraints are violated. To maximize a function, subject to some equality constraints, a Quadratic Penalty subtracts the weighted sum of the constraints squared. The unconstrained Quadratic Penalty version of the task becomes $$\text{maximize}_{\theta, \tilde{\theta}} \lim_{C \to \infty} LL - C \times \text{Penalty} \quad (6)$$

where LL is computed as defined in equation (5) and Penalty=$\Sigma(em_y^2 + tr_y^2 + \tilde{em}_y^2 + \tilde{tr}_y^2)$. The shorthand $$em_y = 1 - \Sigma_{\forall x_i \in V_X} p(x_i|y)$$

is used as the emission probability constraint for state y (all $x_i$ in the observation alphabet given the state y must sum to 1) and $$tr_y = 1 - \Sigma_{\forall y_i \in V_Y} p(y_i|y)$$

is used as the transition probability constraints for state y (all $y_i$ in the state alphabet given the state y), for generative parameters, and similarly $\tilde{em}_y$ and $\tilde{tr}_y$ for discriminative parameters.

The intuition is that since the gradient at a local maximum is 0, if C is very large the constraints should be satisfied in order to drive the gradient down to 0. Since the task becomes unstable or infinite for a very large C, the optimization is solved sequentially. At step k EQ. (6) is solved for a fixed $C_k$ by extracting the gradients of LL−C×Penalty with respect to the transition and emission probabilities, and then setting to 0 to solve for $\theta_k^*, \tilde{\theta}_k^*$. The solutions $\theta_k^*, \tilde{\theta}_k^*$ are used to initialize the next iteration at step k+1 where $C_{k+1}$ is incremented. The iterations are repeated until convergence, or until a maximum number iteration steps have been executed. According to an embodiment of the invention, the values $C_0=100$, and $C_{k+1}=10C_k$ are used. According to an embodiment of the invention, for a fixed $C_k$ a limited memory quasi-Newton method with line search can be used to speed up the convergence.

Gradient Updates

According to an embodiment of the invention, gradient updates for a hybrid HMM objective function are now presented for the penalty terms and for the log-likelihood terms. For convenience and to avoid negative probabilities, the probabilities are parameterized using exponential weights $p(x_i|y_j) = \exp(w_{x_i,y_j})$ and $p(y_i|y_j) = \exp(w_{y_i,y_j})$, and similarly for $\tilde{p}$. For all gradient functions, the gradient updates will be presented for $$\frac{\partial f}{\partial p_i}.$$

The function $$\frac{\partial f}{\partial w_i}$$

can be computed using the chain rule, since $$\frac{\partial f}{\partial w_i} = \frac{\partial f}{\partial p_i} \frac{\partial p_i}{\partial w_i} = p_i \frac{\partial f}{\partial p_i}.$$

For the constraints penalty, the chain rule can be used for the penalty term:

$$\frac{\partial \text{Penalty}}{\partial p(x_i|y_j)} = 2em_{y_j} \frac{\partial em_{y_j}}{\partial p(x_i|y_j)} = -2em_{y_j}, \quad (7)$$

$$\frac{\partial \text{Penalty}}{\partial p(y_i|y_j)} = 2tr_{y_j} \frac{\partial tr_{y_j}}{\partial p(y_i|y_j)} = -2tr_{y_j}, \quad (8)$$

and the updates for $\tilde{p}$ can be computed similarly. The loglikelihood function is decomposed as a sum of three terms: the prior, the joint likelihood, and the marginalized likelihood for $X = x_1 \ldots x_T$, an arbitrary sentence from D, and computations for each of those are shown separately. The derivatives with respect to emission and transition probabilities of p(X,Y) and p(X) are of interest. Note, that even though there are θ and $\tilde{\theta}$ as the parameter vectors, the functions for computing the gradient will take the same form, and thus only formulas for θ will be presented. The derivatives of log p(X, Y) with respect the emission and transition probabilities are:

$$\frac{\partial \log p(X,Y)}{\partial p(y_i|y_j)} = \sum_{t=1}^{T} \frac{I_{y_i=y_i, y_{i-1}=y_j}}{p(y_i|y_j)}, \quad (9)$$

$$\frac{\partial \log p(X,Y)}{\partial p(x_i|y_j)} = \sum_{t=1}^{T} \frac{I_{x_i=x_i, y_i=y_j}}{p(x_i|y_j)}, \quad (10)$$

where $I_{y_i=y_i,y_{i-1}=y_j}$ is an indicator function. The derivatives of log p(X) are:

$$\frac{\partial \log p(X)}{\partial p(y_i \mid y_j)} = \frac{\sum_{t=1}^{T} p(x_t \mid y_i)\beta_t(y_i)\alpha_{t-1}(y_j)}{p(X)}, \quad (11)$$

$$\frac{\partial \log p(X)}{\partial p(x_i \mid y_j)} = \frac{\sum_{t=1}^{T} I(x_t = x_i)\frac{\beta_t(y_j)\alpha_t(y_j)}{p(x_i \mid y_j)}}{p(X)}, \quad (12)$$

Finally, the gradients for the trade-off prior $$\log p(\theta, \tilde{\theta}) \propto \frac{1}{\sigma} \exp\left(-\frac{\|\theta - \tilde{\theta}\|^2}{2\sigma^2}\right)$$

are $$\frac{\partial}{\partial \theta_k} \log p(\theta, \tilde{\theta}) = \frac{\tilde{\theta}_k - \theta_k}{\sigma^2}, \quad (13)$$

$$\frac{\partial}{\partial \tilde{\theta}_k} \log p(\theta, \tilde{\theta}) = \frac{\theta_k - \tilde{\theta}_k}{\sigma^2}, \quad (14)$$

where $\sigma(\alpha)$ is computed as described before. Here $\theta_k$ and $\tilde{\theta}_k$ are used as the $k^{th}$ parameter in the vector of parameters $\theta$ and $\tilde{\theta}$.

The correctness of the analytical derivatives and their implementation was verified by checking the gradient using a numerical approximation of the derivative.

Implementation

Figure 3:
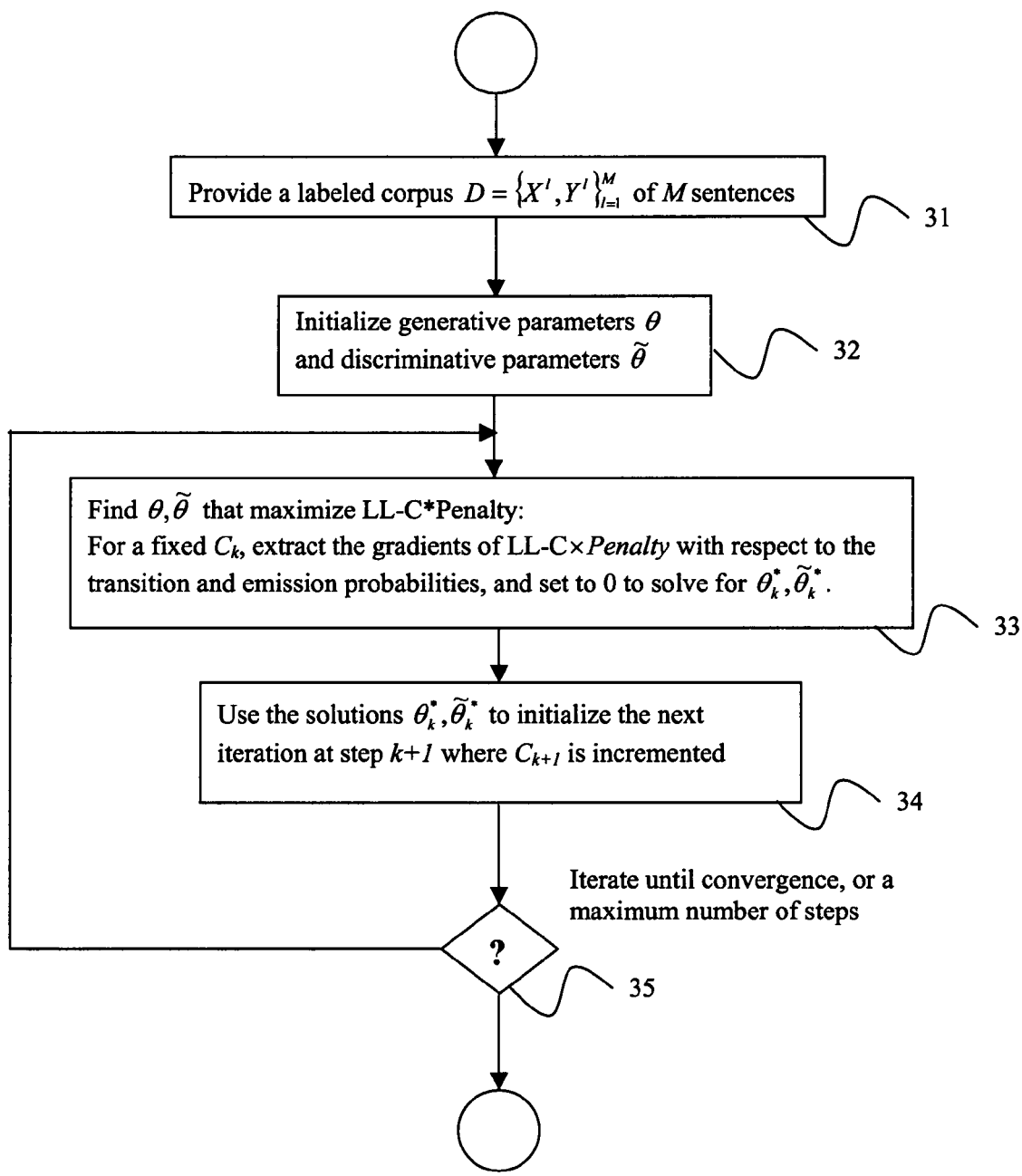
FIG. 3 is a flowchart of a method for sequence tagging using a hybrid hidden Markov model, according to an embodiment of the invention.

A flowchart of a method for sequence tagging using a hybrid hidden Markov model is presented in FIG. 3. Referring now to the figure, a method begins at step 31 by providing a labeled corpus $D=\{X^l, Y^l\}_{l=1}^{M}$, of M sentences, wherein $X=x_1 \ldots x_n$ is a sentence, $x_j$ is a word at position j from a finite vocabulary $V_X$, and each word $x_j$ has a label $y_j$ from a finite vocabulary $V_Y$, and Y is the collection of labels for the sentence X. At step 32, initialize generative parameters $\theta=\{p(x_i|y_j), p(y_i|y_j), \forall y_i, y_j \in V_Y, \forall x_i \in V_X\}$ and discriminative parameters $\tilde{\theta}=\{\tilde{p}(x_i|y_j), \tilde{p}(y_i|y_j), \forall y_i, y_j \in V_Y, \forall x_i \in V_X\}$ by finding $\theta, \tilde{\theta}$ that maximize $\Pi_{l=1}^{M} p(X^l, Y^l|\theta)$, $\Pi_{l=1}^{M} p(X^l, Y^l|\tilde{\theta})$. These can be are computed using empirical counts.

At step 33, find $\theta, \tilde{\theta}$ that maximize the functional LL−C× Penalty: where (1) LL is a log-likelihood function $$LL = \log p(\theta, \tilde{\theta}) + \prod_{l=1}^{M} [\log p(X^l, Y^l \mid \tilde{\theta}) - \log p(X^l \mid \tilde{\theta})] + \prod_{l=1}^{M} \log p(X^l \mid \theta),$$

with prior $p(\theta, \theta')$ is $$p(\theta, \tilde{\theta}) \propto p(\theta) p(\tilde{\theta}) \frac{1}{\sigma} \exp\left(-\frac{\|\theta - \tilde{\theta}\|^2}{2\sigma^2}\right),$$

joint probability $$p(X^l, Y^l \mid \tilde{\theta}) = \prod_{t=1}^{n} p(x_t^l \mid y_t^l, \tilde{\theta}) p(y_t^l \mid y_{t-1}^l, \tilde{\theta}),$$

and conditional probabilities $p(X_L|\tilde{\theta})$, $p(X^l|\theta)$ calculated using $$p(X \mid \theta) = \sum_y \alpha_t(y \mid \theta)\beta_t(y \mid \theta),$$

where $\alpha$ is a forward probability $$\alpha_t(y_t) = p(x_1, \ldots, x_t, y_t) = p(x_t \mid y_t) \sum_y p(y_t \mid y)\alpha_{t-1}(y),$$

with $\alpha_0=1$, and $\beta$ is a backward probability $$\beta_t(y_t) = p(x_{t+1}, \ldots, x_n \mid y_t) = \sum_y \beta_{t+1}(y) p(x_{t+1} \mid y) p(y \mid y_t)$$

with $\beta_T=1$; and (2) Penalty is a penalty function:

$$\sum_{y \in V_Y} (em_y^2 + tr_y^2 + e\tilde{m}_y^2 + t\tilde{r}_y^2),$$

where $em_y=1-\Sigma_{\forall x_i \in VX} p(x_i|y)$ denotes emission probability constraints for state y and $tr_y=1-\Sigma_{\forall y_i \in V_Y} p(y_i|y)$ denotes transition probability constraints for state y, for generative parameters, and similarly $e\tilde{m}_y$ and $t\tilde{r}_y$ for discriminative parameters. According to an embodiment of the invention, the constant C can be initialized as $C_0=100$.

At step 33, for a fixed $C_k$, extract the gradients of LL−C× Penalty with respect to the transition and emission probabilities, and set to 0 to solve for $\theta_k^*, \tilde{\theta}_k^*$. These solutions $\theta_k^*, \tilde{\theta}_k^*$ can be used at step 34 to initialize the next iteration at step k+1 where $C_{k+1}$ is incremented. According to an embodiment of the invention, $C_{k+1}=10C_k$. At step 35, if the solutions $\theta_k^*, \tilde{\theta}_k^*$ have not converged, or a maximum number of iterations have not been executed, steps 33 and 34 are repeated.

As an alternative initialization at step 32, in addition to initializing $\theta, \tilde{\theta}$ as given, only the conditional likelihoods $p(X^l|\tilde{\theta})$, $p(X^l|\theta)$ are optimized for several iterations, before optimizing the full functional LL−C*Penalty.

Experimental Setup and Results

Results of experiments using embodiments of the invention were compared with those from a purely discriminative model (CRF) and a purely generative model (HMM).

According to an embodiment of the invention, a heuristic was implemented to initialize the parameters before performing the Quadratic Penalty optimization. Parameters $\theta$ and $\tilde{\theta}$ were initialized with the solutions to the generative model, which are computed using empirical counts. Such an initialization provides a "good enough" starting point, and the optimization improves the model from that point on, and it is possible that fewer iterations will be needed to achieve a local maximum than a random initialization. This initialization also insures that a model according to an embodiment of the invention is usable from the very first iteration. Another heuristic that can be employed is to initialize the parameters as mentioned, optimize only the conditional likelihood for several iterations, and then go into the Quadratic Penalty optimization. In this way, both, generative $\theta$ and discriminative $\tilde{\theta}$ parameters will be at a "good" starting point.

Small Data

The CRF and HMM used were as implemented in Mallet, a machine learning-for-language toolkit available at http://mallet.cs.umass.edu, and Mallet was used as a base for the implementation of a model according to an embodiment of the invention. A first set of experiments was performed on several relatively small datasets with various NLP tasks. These tasks included recognizing noun phrases (baseNP), chunking (a subset of the CoNLL-2000 shared task, described below), named entity recognition in Japanese language (japaneseNE), and segmentation of Chinese phrases (segmentation). (These data are available with the CRF++ toolkit at http://crfpp.sourceforge.net/.) These datasets have about ~800 words in the vocabulary and 400 sentences in the training data. In all experiments, the data is split into the training and testing sets so that the same data can be used for training and evaluating all classifiers, with word information used for HMM, CRF and a hybrid model according to an embodiment of the invention. While the maximum entropy Markov model (MEMM) is a discriminative version of the Hidden Markov Model, the CRF was used because it has been shown to have better discriminative power than MEMM, and thus sets a stronger baseline for experimental evaluation. The trade-off parameter was set of 0.5 for a hybrid model according to an embodiment of the invention. FIG. 2 is a table of results comparing performance accuracies (in %) of CRF, HMM, and a hybrid model according to an embodiment of the invention for $\alpha=0.5$ for small datasets.

Shallow Parsing

Shallow parsing, or chunking, is an intermediate step to constructing the full parse tree. It segments a sentence into syntactically correlated words. To apply a hybrid model according to an embodiment of the invention to the chunking tasks, the CoNLL-2000 shared task was used. (The training and test sets are pre-defined by the task for fair comparison of all models.) Shallow parsing segments sentences into noun phrases, verb phrases, prepositional phrases, adjective phrases and adverb phrases. The training data includes 8,936 labeled sentences with approximately 26,000 words in the vocabulary. In order to tune the trade-off parameter 30% of the training data was used for validation, although preliminary experiments with this data indicated the parameter choice made only a marginal difference. The model was trained on the 70% of the training data, and then the value of the parameter which resulted in the highest accuracy on the validation set was used to train the model, which was then tested on the test data, completely independent of train/validation sets. Only word information for HMM, CRF and Hybrid HMM was used. It is possible to achieve a much higher performance by extending the feature set, such as including part-of speech tags, information about previous and next words, and the combinations of those. HMMs and a hybrid model according to an embodiment of the invention can be augmented with such feature information by assuming emission from a state to all such features for a given state, or equivalently, assuming a Naive Bayes model for features to estimate the emission probability. An 87% accuracy of classification was obtained on the test set after applying the HMM, 88.5% after applying the CRF, and 89.15% after using a hybrid model according to an embodiment of the invention.

Named Entity Recognition

Named entity recognition (NER) is another task which can be viewed as a structured output prediction problem. For each word in a sentence, the task determines which named-entity the word belongs to. In the experiments a language-independent named-entity recognition CoNLL-2002 shared task was used, which predict whether this word is a semantic part of "person", "organization", "location", "miscellaneous" or does not belong to any of the categories. The train and test data were used in two different languages: Spanish and Dutch. Both training datasets contain approximately 8,000 labeled sentences, and 28,000 words in the vocabulary. As in the previous experiments, only word information was used. A similar procedure was performed as in the previous experiment to find the choice for the trade-off parameter. For NER on the Spanish test set, a 93.74% accuracy was obtained with HMM, 93.90% accuracy with the CRF and 93.99% accuracy with a hybrid model according to an embodiment of the invention. For NER on the Dutch test set a 94.29% accuracy was obtained with HMM, 94.38% accuracy with the CRF and 94.42% accuracy with a hybrid model according to an embodiment of the invention. While a hybrid model according to an embodiment of the invention still outperforms both generative and discriminative models, one can argue that the improvement in performance very small, and all three models have a very similar performance.

Systems

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 4:
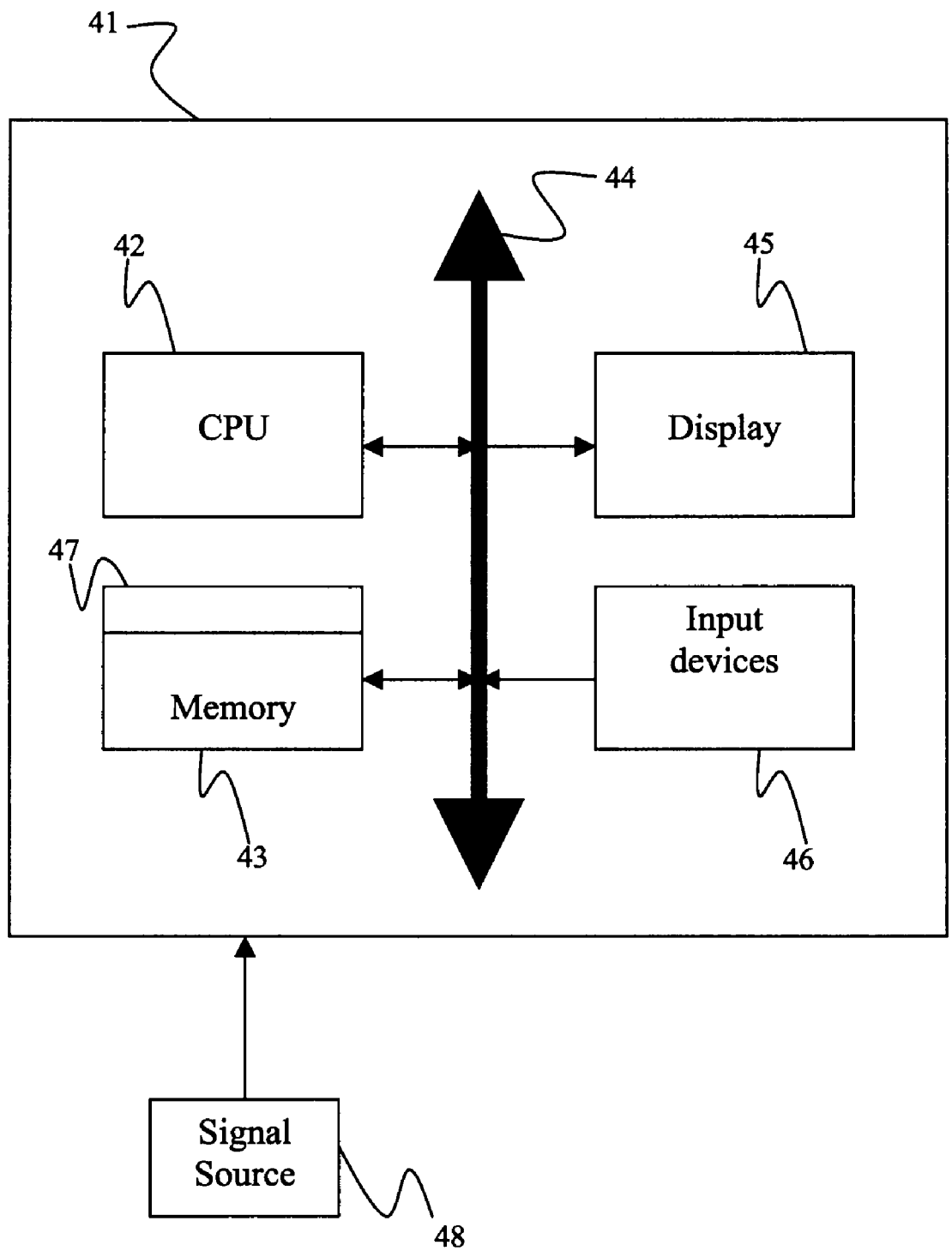
FIG. 4 is a block diagram of an exemplary computer system for implementing a method for sequence tagging using a hybrid hidden Markov model, according to an embodiment of the invention.

FIG. 4 is a block diagram of an exemplary computer system for implementing a hybrid hidden Markov model for sequence tagging in medical patient records mining according to an embodiment of the invention. Referring now to FIG. 4, a computer system 41 for implementing the present invention can comprise, inter alia, a central processing unit (CPU) 42, a memory 43 and an input/output (I/O) interface 44. The computer system 41 is generally coupled through the I/O interface 44 to a display 45 and various input devices 46 such as a mouse and a keyboard. The support circuits can include circuits such as cache, power supplies, clock circuits, and a communication bus. The memory 43 can include random access memory (RAM), read only memory (ROM), disk drive, tape drive, etc., or a combinations thereof. The present invention can be implemented as a routine 47 that is stored in memory 43 and executed by the CPU 42 to process the signal from the signal source 48. As such, the computer system 41 is a general purpose computer system that becomes a specific purpose computer system when executing the routine 47 of the present invention.

The computer system 41 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A program storage device readable by a computer, tangibly embodying a program of instructions executable by the computer to perform a method for sequence tagging medical patient records, the method comprising the steps of:

providing a labeled corpus $D=\{X^l, Y^l\}_{l=1}^M$ of M sentences taken from a set of medical records, wherein $X=x_i \ldots x_n$ is a sentence, $x_j$ is a word at position j from a finite vocabulary $V_x$, each word $x_j$ having a label $y_j$ from a finite vocabulary $V_Y$, and Y is a collection of labels for the sentence X, wherein said labels are sequence tags for sentence X;

initializing generative parameters $\theta$ and discriminative parameters $\tilde{\theta}$, wherein $\theta=\{p(x_i|y_j), p(y_i|y_j), \forall y_j, y_j \in V_Y, \forall x_i \in V_X\}$ are generative parameters and $\tilde{\theta}=\{\tilde{p}(x_i|y_j), \tilde{p}(y_i|y_j), \forall y_j, y_j \in V_Y, \forall x_i \in V_X\}$ are discriminative parameters, and $p(x_i|y_j), \tilde{p}(x_i|y_j)$ are emission probabilities and $p(y_i|y_j), \tilde{p}(y_i|y_j)$ are transition probabilities; and finding parameters $\theta, \tilde{\theta}$ that maximize a functional LL−C×Penalty, wherein LL is a log-likelihood function $$LL = \log p(\theta, \tilde{\theta}) + \prod_{l=1}^M \left[\log p(X^l, Y^l | \tilde{\theta}) - \log p(X^l | \tilde{\theta})\right] + \prod_{l=1}^M \log p(X^l | \theta),$$

wherein $$p(\theta, \tilde{\theta}) \propto p(\theta) p(\tilde{\theta}) \frac{1}{\sigma} \exp\left(-\frac{\|\theta - \tilde{\theta}\|^2}{2\sigma^2}\right)$$

is a prior wherein σ is a tradeoff parameter that balances contributions of the generative parameters and discriminative parameters, $$p(X^l, Y^l | \tilde{\theta}) = \prod_{t=1}^n p(x_t^l | y_t^l, \tilde{\theta}) p(y_t^l | y_{t-1}^l, \tilde{\theta}),$$

and $p(X_L|\tilde{\theta})$, $p(X^l|\theta)$ are calculated as $$p(X|\theta) = \sum_y \alpha_t(y|\theta) \beta_t(y|\theta),$$

wherein $$\alpha_t(y_t) = p(x_1, \ldots, x_t, y_t) = p(x_t | y_t) \sum_y p(y_t | y) \alpha_{t-1}(y),$$

with $\alpha_0=1$, and $$\beta_t(y_t) = p(x_{t+1}, \ldots, x_n | y_t) = \sum_y \beta_{t+1}(y) p(x_{t+1} | y) p(y | y_t)$$

with $\beta_t=1$, Penalty is a penalty function defined as $$\sum_{y \in V_Y} (em_y^2 + tr_y^2 + e\tilde{m}_y^2 + t\tilde{r}_y^2),$$

where $$em_y = 1 - \sum_{\forall x_i \in V_X} p(x_i | y), \quad e\tilde{m}_y = 1 - \sum_{\forall x_i \in V_X} \tilde{p}(x_i | y)$$

are emission probability constraints for state y and $$tr_y = 1 - \sum_{\forall y_i \in V_Y} p(y_i | y), \quad t\tilde{r}_y = 1 - \sum_{\forall y_i \in V_Y} \tilde{p}(y_i | y)$$

are transition probability constraints for state, and C is a constant, wherein parameters $\theta, \tilde{\theta}$ are the probabilities that a new sentence X' is labeled as Y'.

2. The computer readable program storage device of claim 1, wherein initializing parameters $\theta$ and $\tilde{\theta}$ comprises finding $\theta, \tilde{\theta}$ that maximize $$\prod_{l=1}^M p(X^l, Y^l | \theta), \prod_{l=1}^M p(X^l, Y^l | \tilde{\theta}).$$

3. The computer readable program storage device of claim 1, wherein maximizing LL−C×Penalty comprises fixing C, extracting gradients of LL−C×Penalty with respect to said transition and emission probabilities, solving for $\theta_k^*, \tilde{\theta}_k^*$, initializing a new iteration with $\theta_k^*, \tilde{\theta}_k^*$ and incrementing C, and repeating said steps of extracting gradients and initializing a new iteration until solutions $\theta_k^*, \tilde{\theta}_k^*$ have converged, or until a maximum number of iterations have been executed.

4. The computer readable program storage device of claim 1, wherein said sequence tagging comprises one of part-of-speech tagging, shallow parsing, and named entity recognition.

5. The computer readable program storage device of claim 2, the method further comprising maximizing only the conditional likelihoods $p(X^l|\tilde{\theta})$, $p(X^l|\theta)$ of functional LL−C×Penalty for a predetermined number of iterations, prior to maximizing LL−C×Penalty.

6. A program storage device readable by a computer, tangibly embodying a program of instructions executable by the computer to perform the method steps for sequence tagging medical patient records, the method comprising the steps of:

providing a labeled corpus $D=\{X^l,Y^l\}_{l=1}^{M}$ of M sentences taken from a set of medical records, wherein $X=x_1\ldots x_n$ is a sentence, $x_j$ is a word at position j from a finite vocabulary $V_x$, each word $x_j$ having a label $y_j$ from a finite vocabulary $V_Y$, and Y is a collection of labels for the sentence X, wherein said labels are sequence tags for sentence X;

initializing generative parameters $\theta$ and discriminative parameters $\tilde{\theta}$, wherein $\theta=\{p(x_i|y_j), p(y_i|y_j), \forall y_j, y_i \in V_Y, \forall x_i \in V_x\}$ are generative parameters and $\tilde{\theta}=\{\tilde{p}(x_i|y_j), \tilde{p}(y_i|y_j), \forall y_j, y_i \in V_Y, \forall x_i \in V_x\}$ are discriminative parameters, and $p(x_i|y_j), \tilde{p}(x_i|y_j)$ are emission probabilities and $p(y_i|y_j), \tilde{p}(y_i|y_j)$ are transition probabilities;

providing a functional LL−C×Penalty, wherein LL is a log-likelihood function $$LL = \log p(\theta,\tilde{\theta}) + \prod_{l=1}^{M}\left[\log p(X^l,Y^l|\tilde{\theta}) - \log p(X^l|\tilde{\theta})\right] + \prod_{l=1}^{M}\log p(X^l|\theta),$$

$$\text{Penalty} = \sum_{y \in V_Y}(em_y^2 + tr_y^2 + e\tilde{m}_y^2 + t\tilde{r}_y^2),$$

wherein $$em_y = 1 - \sum_{\forall x_i \in V_X}p(x_i|y), e\tilde{m}_y = 1 - \sum_{\forall x_i \in V_X}\tilde{p}(x_i|y)$$

are emission probability constraints for state y, $$tr_y = 1 - \sum_{\forall y_i \in V_Y}p(y_i|y), t\tilde{r}_y = 1 - \sum_{\forall y_i \in V_Y}\tilde{p}(y_i|y)$$

are transition probability constraints for state y, and C is a constant; and extracting gradients of LL−C×Penalty with respect to said transition and emission probabilities and solving $\theta_k^*, \tilde{\theta}_k^*$ that maximize LL−C×Penalty, wherein parameters $\theta, \tilde{\theta}$ are the probabilities that a new sentence X' is labeled as Y'.

7. The computer readable program storage device of claim 6, wherein $p(X_L|\tilde{\theta})$, $p(X^l|\theta)$ are calculated as $$p(X|\theta) = \sum_y \alpha_t(y|\theta)\beta_t(y|\theta),$$

wherein $$\alpha_t(y_t) = p(x_1,\ldots,x_t,y_t) = p(x_t|y_t)\sum_y p(y_t|y)\alpha_{t-1}(y),$$

with $\alpha_0=1$, and $$\beta_t(y_t) = p(x_{t+1},\ldots,x_n|y_t) = \sum_y \beta_{t+1}(y)p(x_{t+1}|y)p(y|y_t)$$

with $\beta_t=1$.

8. The computer readable program storage device of claim 6, the method further comprising initializing a new iteration with $\theta_k^*, \tilde{\theta}_k^*$ and incrementing C; and repeating said steps of extracting gradients and initializing a new iteration until solutions $\theta_k^*, \tilde{\theta}_k^*$ have converged, or until a maximum number of iterations have been executed.

9. The computer readable program storage device of claim 6, wherein $$p(\theta,\tilde{\theta}) \propto p(\theta)p(\tilde{\theta})\frac{1}{\sigma}\exp\left(-\frac{\|\theta-\tilde{\theta}\|^2}{2\sigma^2}\right)$$

is a prior wherein $\sigma$ is a tradeoff parameter that balances contributions of the generative parameters and discriminative parameters.

10. The computer readable program storage device of claim 6, wherein $$p(X^l,Y^l|\tilde{\theta}) = \prod_{t=1}^{n}p(x_t^l|y_t^l,\tilde{\theta})p(y_t^l|y_{t-1}^l,\tilde{\theta}).$$

11. The computer readable program storage device of claim 6, wherein $p(X_L|\tilde{\theta})$, $p(X^l|\theta)$ are calculated as $$p(X|\theta) = \sum_y \alpha_t(y|\theta)\beta_t(y|\theta),$$

wherein $$\alpha_t(y_t) = p(x_1,\ldots,x_t,y_t) = p(x_t|y_t)\sum_y p(y_t|y)\alpha_{t-1}(y),$$

with $\alpha_0=1$, and $$\beta_t(y_t) = p(x_{t+1},\ldots,x_n|y_t) = \sum_y \beta_{t+1}(y)p(x_{t+1}|y)p(y|y_t)$$

with $\beta_t=1$.

* * * * *